United States Patent
Martin et al.

[11] Patent Number: 5,810,581
[45] Date of Patent: Sep. 22, 1998

[54] PRE-HEATING OF PROCESS STREAM FOR THERMAL OXIDIZERS

[75] Inventors: Gary Martin, Upland; David Chiles, Rancho Cucamonga, both of Calif.

[73] Assignee: Smith Engineering Company, Ontario, Calif.

[21] Appl. No.: 700,077

[22] Filed: Aug. 20, 1996

[51] Int. Cl.$^6$ ............................................. F27D 17/00
[52] U.S. Cl. ................................ 432/181; 110/345
[58] Field of Search ...................... 432/72, 179, 180, 432/181; 110/211, 345

*Primary Examiner*—Henry A. Bennett
*Assistant Examiner*—Gregory Wilson
*Attorney, Agent, or Firm*—Niro, Scavone, Haller & Niro

[57] ABSTRACT

A method for processing an air stream using a thermal oxidizer, by pre-heating the air stream, without the use of auxiliar heat, and substantially eliminating the condensation of organic or inorganic compounds within the air stream to be treated.

6 Claims, 1 Drawing Sheet

PRE-HEATING OF PROCESS STREAM FOR THERMAL OXIDIZERS

BACKGROUND OF THE INVENTION

The present invention generally relates to a process for preheating process streams for use by thermal oxidizers. Using the present invention, condensation of organic or inorganic compounds in the air streams can be eliminated, reducing the risk of pluggage or fire in the thermal oxidizer.

Thermal oxidizers are sometimes required to process streams that have condensable organic or inorganic compounds in the streams. Such thermal oxidizers include regenerative thermal oxidizers (RTO), as well as recuperative, catalytic and regenerative catalytic thermal oxidizers, and the present invention can be used with each type of thermal oxidizer. If these condensibles collect as a liquid or solid in the process duct or in the oxidizer, pluggages and fires can result. This invention discloses methods for pre-heating the inlet stream to prevent this condensation.

Known prior art thermal oxidizers employ auxiliary heating (i.e., heating methods not using the thermal oxidizer itself) to prevent condensation of organic or inorganic compounds. This is inefficient, since heat from outside the system must be employed.

Alternatively, known prior art thermal oxidizers remove or trap condensibles by, for example, washing them out. This is also not desirable since it requires additional equipment and results in waste streams which must then be treated.

It would therefore be advantageous to provide a more reliable and efficient thermal oxidizer which would eliminate or reduce the condensation of organic or inorganic compounds without employing auxiliary heat, and without generating additional waste streams.

SUMMARY OF THE INVENTION

These and other advantages are provided by the present invention, which also preserves the advantages of conventional thermal oxidizers. In addition, the present invention provides new advantages not found currently available thermal oxidizers, and overcomes many of the disadvantages of such equipment.

The invention is generally directed to a method for processing one or more air streams containing pollutants using a thermal oxidizer employing an oxidation chamber. In one preferred method of the present invention, ambient air is mixed with a heated air stream from the oxidation chamber to form an intermediate air stream. This intermediate air stream is then mixed with an air stream to be processed prior to sending it into the heat exchange section of the oxidizer. The resulting air stream mixture is thereby heated to a temperature sufficient to substantially eliminate the condensation of organic or inorganic compounds within it.

In a second preferred embodiment, also directed to a method for processing one or more air streams containing pollutants using a thermal oxidizer employing an oxidation chamber, a heat exchanger is provided that is in heat exchange relationship with an inlet air stream to be processed by the thermal oxidizer. A heated outlet air stream from the thermal oxidizer is passed through the heat exchanger to thereby heat the inlet air stream to a temperature sufficient to substantially eliminate the condensation of organic or inorganic compounds within it. The heated inlet air stream is then conveyed to the thermal oxidizer for processing.

In a third preferred embodiment, the outlet gases from a thermal oxidizer are used to heat the incoming gases to be treated. This is done by designing a duct within a duct, so that the hot outlet gases flow past, and in heat exchange relationship with, the incoming process gases. To accomplish this, a concentric-type heat exchanger is preferably employed. In this fashion, the inlet air stream is heated to a temperature sufficient to substantially eliminate the condensation of organic or inorganic compounds present within the air stream.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings in which:

DETAILED DESCRIPTION OF THE PREFERRED EMBODIMENTS

The preferred embodiments of the present invention will be described with respect to the use of the invention with a regenerative thermal oxidizer (RTO). RTOs are known for oxidizing pollutants, such as hydrocarbon vapors in air. In a conventional RTO, a pollutant-laden "dirty" gas to be cleaned is directed into a combustion chamber to be oxidized and burned (typically at temperatures in excess of 1500° F.); the oxidized gas is then directed out of the combustion chamber and through a "cooling" (previously heated) second regenerative heat exchanger. By alternating the flow of cool gas to be cleaned through a hot heat exchanger, and moving the hot cleaned gas from the combustion chamber and through a "cooled" heat exchanger, an RTO can continuously operate to efficiently oxidize pollutant-laden gases. Examples of such RTOs are shown in U.S. Pat. Nos. 5,026,277 and 5,352,115, the disclosures of which are incorporated herein by reference.

In each of the embodiments described in the three drawings, the thermal oxidizer, generally designated as 5, includes a heat exchanger section 10, a retention chamber 20 (also known as a combustion or oxidation chamber), fans 30 and associated duct work for directing the air streams. (Either induced draft ("ID") or forced draft fans can be used, for example.)

Figure 1:
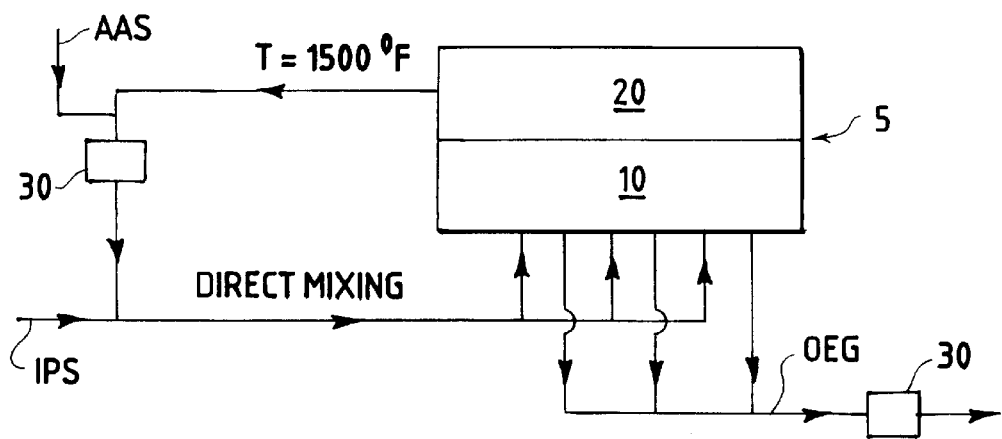
FIGS. 1–3 are schematic views showing three alternative embodiments of the present invention.

Referring now to FIG. 1, one method of the present invention employs heated air from oxidation chamber 20 of RTO 5. This air is cooled by contact with ambient air stream AAS, and the resulting warm air is then mixed with inlet process stream (IPS), heating the IPS to a temperature sufficient to substantially eliminate the condensation of organic or inorganic compounds present within the air stream, prior to directing it into the RTO.

Figure 2:
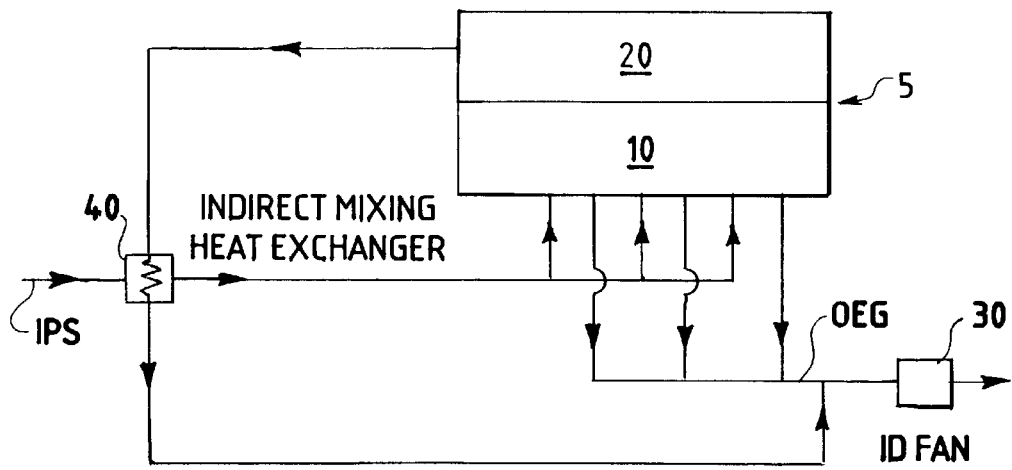

Referring now to FIG. 2, in a second method of the present invention, air from oxidation chamber 20 of RTO 5 is passed through indirect mixing heat exchanger 40. Heat exchanger 40 is placed within the path of inlet process stream IPS, heating the IPS to a temperature sufficient to substantially eliminate the condensation of organic or inorganic compounds present within the air stream, prior to directing it into the RTO.

Figure 3:
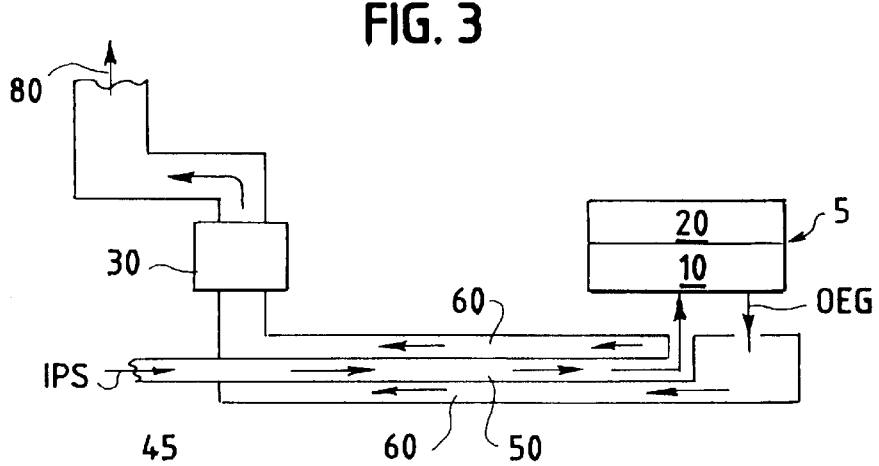

Referring now to FIG. 3, in a third method of the present invention, the outlet exhaust gases (OEG) from RTO 5 are used to heat the inlet process stream (IPS) for the RTO. This is accomplished by employing a duct within a duct. The resulting heat exchanger, preferably in the form of a concentric-tube heat exchanger, as shown, is designated generally as 45. Thus, as the IPS travels through inlet duct 50 in the direction of the arrows, the OEG process streams travelling through outlet ducts 60 in the opposite direction are cooled; conversely, the IPS travelling through inlet duct 50 is indirectly heated by the OEG process streams. The OEG air streams from outlet ducts 60 are then blown by fan 30 to stack 80. Once again, the IPS is heated to a temperature sufficient to substantially eliminate the condensation of organic or inorganic compounds present within the air stream, prior to directing it into the RTO. It will be understood that this method improves the overall thermal efficiency of the oxidizer.

As used here, the phrase "temperature sufficient to substantially eliminate the condensation of organic or inorganic compounds" means a temperature which will eliminate or reduce the condensation of organic or inorganic compounds within an air stream to be processed, to a degree so that the thermal oxidizer will not malfunction or suffer material inefficiencies.

It will be understood that the invention may be embodied in other specific forms without departing from its spirit or central characteristics. The present examples and embodiments, therefore, are to be considered in all respects as illustrative and not restrictive, and the invention is not to be limited to the details given here.

We claim:

1. A method for processing one or more gas streams containing pollutants using a thermal oxidizer employing a heat exchanger and an oxidation chamber, comprising the steps of;

mixing ambient air with a heated gas stream from the oxidation chamber to form a cooler intermediate gas stream;

mixing the intermediate gas stream with an inlet gas stream to be processed by the oxidizer, to form a resulting gas stream which has a temperature sufficient to substantially eliminate the condensation of organic or inorganic compounds prior to directing the resulting gas stream into the thermal oxidizer; and directing a treated gas stream exiting the thermal oxidizer for further processing or releasing it to atmosphere.

2. The method for processing one or more air streams of claim 1, wherein the resulting air stream is heated without the use of auxiliary heat from outside the thermal oxidizer.

3. A method for processing one or more gas streams containing pollutants using a thermal oxidizer employing a heat exchanger and an oxidation chamber, comprising the steps of:

providing a second heat exchanger in heat exchange relationship with an inlet air stream to be processed by the thermal oxidizer;

passing a heated outlet gas stream from the thermal oxidizer through the second heat exchanger to thereby heat the resulting gas stream to a temperature sufficient to substantially eliminate the condensation of organic and inorganic compounds contained therein;

conveying the resulting gas stream to the thermal oxidizer; and directing a treated gas stream exiting the thermal oxidizer for further processing or releasing it to the atmosphere.

4. A method for processing one or more air streams containing pollutants using a thermal oxidizer comprising the steps of:

providing one or more inlet ducts for conveying at least one inlet air stream to be processed by the thermal oxidizer;

providing one or more outlet ducts for conveying heated outlet gas exiting from the thermal oxidizer after processing, the one or more inlet and outlet ducts being portioned in heat exchange relationship relative to each other;

heating the at least one inlet air stream as it passes through the one or more inlet ducts using heat from the outlet gas as it passes through the one or more outlet ducts, to a temperature sufficient to substantially eliminate the condensation of organic or inorganic compounds contained therein;

conveying the heated inlet air stream to the thermal oxidizer for treatment; and directing a treated gas stream exiting the thermal oxidizer for further processing or releasing it to the atmosphere.

5. The method of claim 3, wherein the inlet air stream is heated using an indirect mixing heat exchanger.

6. The method of claim 4, wherein the inlet air stream is heated using a concentric tube heat exchanger comprising the one or more inlet and outlet ducts.

* * * * *